United States Patent
Siegrist et al.

[11] Patent Number: 5,855,829
[45] Date of Patent: Jan. 5, 1999

[54] METHOD AND APPARATUS FOR CONTROLLING THE NOZZLE ENGAGEMENT IN AN ELECTRIC INJECTION MOLDING MACHINE

[75] Inventors: Ronald Siegrist, Oberuzwil; Bruno Stillhard, St. Gallen, both of Switzerland

[73] Assignee: ProControl AG, Flawil, Switzerland

[21] Appl. No.: 569,145

[22] PCT Filed: May 8, 1995

[86] PCT No.: PCT/CH95/00106

§ 371 Date: Dec. 18, 1995

§ 102(e) Date: Dec. 18, 1995

[87] PCT Pub. No.: WO95/30529

PCT Pub. Date: Nov. 16, 1995

[30] Foreign Application Priority Data

May 10, 1994 [CH] Switzerland ............... 1454/94

[51] Int. Cl.$^6$ ..................................... B29C 45/76
[52] U.S. Cl. .................. 264/40.1; 425/150; 425/574
[58] Field of Search .................... 425/150, 574; 264/40.2

[56] References Cited

U.S. PATENT DOCUMENTS

| | | | |
|---|---|---|---|
| 5,035,599 | 7/1991 | Harashima et al. | 425/150 |
| 5,147,659 | 9/1992 | Watanabe et al. | 425/574 |

FOREIGN PATENT DOCUMENTS

| | | |
|---|---|---|
| 422224 | 4/1991 | European Pat. Off. . |
| 627289 | 12/1993 | European Pat. Off. . |
| 1184455 | 7/1959 | France . |
| 1124235 | 2/1962 | Germany . |
| 5147077 | 6/1993 | Japan . |
| 6079759 | 3/1994 | Japan . |

*Primary Examiner*—Tim Heitbrink
*Attorney, Agent, or Firm*—Finnegan, Henderson, Farabow, Garrett & Dunner, L.L.P.

[57] ABSTRACT

So that the injection nozzle (1) in an electrically driven injection molding machine may be driven free of shock into engagement with the mold (10), a spring has been interposed until the present time. The invention now proposes to delete this spring. The injection nozzle (1) is clamped between the stationary mold (10) and the injection unit (4) by two tie bolts or shafts (9) by the electric motor drive. Initially, the injection nozzle (1) is driven into engagement free of shock, for instance by presetting a brake ramp. Thereafter, the nozzle engagement force is adjusted as a function of the injection force or the pressure of the injection material, as the case may be, by way of a corresponding control device. In this manner, a constant equilibrium of engagement pressure and the opening force in the pressure is established, with selectable initial engagement tension. The energy consumption of the drive motor is reduced. With a special structural arrangement the complexity of the controls is substantially less.

13 Claims, 3 Drawing Sheets

METHOD AND APPARATUS FOR CONTROLLING THE NOZZLE ENGAGEMENT IN AN ELECTRIC INJECTION MOLDING MACHINE

BACKGROUND OF THE INVENTION

1. Field of the Invention

The invention relates to a method and an apparatus for controlling the nozzle engagement of an injection molding unit in electrically driven injection molding machines.

2. Description of Related Art

While nozzle engagement and pressing the nozzle into engagement with the mold are among the most important parameters in an injection molding machine, as regards the injection operation they are actually one of the less relevant ones. There is a demand for a rapid and an as careful as possible nozzle engagement at a large engagement force, so that no melt escapes between the injection nozzle and its injection port at the extremely high injection pressure of 2,000 bar and more. Escaping material directly influences the operational precision and causes an annoying waste of plastic. In an extreme case, it may also lead to an interruption of the automatic injection operation, for the tightness is reduced further with an increased escape of material. The aim of the nozzle engagement is to find an optimum as regards speed of movement while preventing an abrupt engagement and unnecessarily large engagement forces. If the nozzle engagement force is too large, it may even lead to mechanical damage of the mold or the mold support.

As far as is known to the applicant, to optimize the entire nozzle engagement operation in a practical manner, a mechanical compression spring or an entire spring system is mounted between the drive and the slide mechanism of the injection unit of all conventional electrically driven injection molding machines. In such arrangements the spring serves several functions, so that the nozzle engagement force is be controllable by electric motor drives. For instance, European Patent No. 328,671 proposes to prestress a double spring package to a greater or lesser degree, so that the corresponding force may be preset for varying engagement forces. To generate the actual nozzle engagement force, an additional spring play of up to several millimeters is tolerated. This play has to be compensated by appropriate open and closed loop controls by the drive motor. The spring package renders the entire system resilient, which, on the one hand, yields advantages, but, on the other hand, leads to an enormous complication of the control technology for an actually very simple operation. In terms of the operation, the only requirement is to maintain the nozzle in tight engagement with the injection port.

The subsequent European Patent No. 422,224 attempts to overcome this disadvantage by providing additional power sensors or strain gages, as the case may be, in the vicinity of the injection unit. A predetermined nozzle engagement force is preset, and thereafter the drive motor is controlled by comparing the measured force against the preset force, or on the basis of the deviation between the desired and actual forces. Even though the control technology per se could be simplified, the overall system remains complicated, may be prone to malfunction, and is rather complex especially as regards its structure.

SUMMARY OF THE INVENTION

It is a task of the invention to find a novel solution which avoids the known disadvantages but which nevertheless achieves a genuine optimization of the known nozzle engagement operation in an electrically driven injection molding machine. A simple solution as regards structure and control technology was a particular object of the invention.

The method in accordance with the invention is characterized by the fact that the injection nozzle is driven, for instance by presetting a brake ramp (deceleration curve), into shock-free engagement, is clamped against the mold, and that thereafter the nozzle engagement force is adjusted as a function of the injection force or pressure, as the case may be, of the injection material.

In prior solutions it has been overlooked that the entire injection operation represents a highly dynamic sequence. A predetermined desired nozzle engagement force can at best be preset for maximum values. Yet any such maximum value is active during a predetermined phase of the entire injection operation only, for instance during the dwell pressure phase (Nachdruckphase), and even at this phase it is active only intermittently. The dwell pressure phase takes up at most about one-third of the entire injection cycle. By presetting a desired nozzle engagement force, an unnecessarily large engagement pressure is developed for the greater portion. Thus, the defined task is be missed. By contrast, the invention proposes to utilize the injection pressure per se or a correlative value, such as, for instance, the injection pressure, and to adjust the engagement force as a function of the injection pressure or the injection force, as the case may be, and, more particularly, as a function of their respective progress. During the filling phase the pressure rises from a zero value and reaches its maximum value at the end of the filling operation or at the beginning of the dwell pressure phase, as the case may be. Shortly after reaching its maximum value, the pressure will drop again, initially slowly and then very steeply, to the plasticizing phase. In accordance with the novel invention, an attempt is made to copy this pressure profile at least in an approximating manner. Thus, a constant equilibrium is aimed at between the injection pressure and the nozzle engagement force, with a minimum force reserve, so that the nozzle always remains in pressed engagement. This yields two special advantages. No unnecessary forces are transmitted to the mold, and the actual motor power can really be reduced to a minimum.

The invention, moreover, relates to an apparatus and is characterized by the fact that a) the injection nozzle may be clamped between a stationary mold section or mold support plate, as the case may be, and an injection unit by one and, preferably, two tie bolts or shafts; and b) there are no springs in the transmission from an electric motor drive for generating the nozzle engagement force, i.e., the structure is relatively rigid; whereby c) control means are provided for adjusting the nozzle engagement force as a function of the injection force or injection pressure and, more particularly, as a function of their respective progress.

Hence, the resiliency of the mechanical system is sacrificed, the invention being instead predicated on a relatively rigid mechanical structure. This permits a much more stable action in terms of controls. The inherent system frequency of, for instance, 30 Hz no longer exerts a detrimental effect. As the injection nozzle is clamped between the stationary mold section and the injection unit and the maximum injection pressure of, for instance, 2,000 bar is built up, as required for the injection process, the plasticizing cylinder is subjected to pressure of a corresponding force. The consequence, based on *Hooke's Law* in accordance with which materials change their length as a function of their constant of elasticity, is a change in length of the plasticizing cylinder of, for instance, 0.1 to 0.2 mm. The extent to which the length changes is a function of the cross-section of the supporting material. The invention provides for clamping a plasticizing cylinder of a length of about 1.0 to 1.2 m between the mold section and the injection unit, by means of tie bolts or shafts. The change in length of the plasticizing cylinder results in an identical change in length of the tie bolts or shafts and thus provide for a corresponding tensional load. The tension force which may be calculated on the basis thereof, is, however, a nozzle engagement force additionally applied to the injection nozzle. By virtue of the geometric system a nozzle engagement force necessarily results which is approximately proportional to the increasing injection force.

The invention takes advantage of this condition in that, in an especially advantageous further embodiment the cross-sectional area of the tie bolt or bolts or shafts, as the case may be, is similar or equal to the effective cross-sectional area of the plasticizing cylinder, just like the optimum ratio of the nozzle engagement force to the injection force, it being assumed that the lengths of the corresponding parts are approximately equal.

Preferably, the ratio of the effective cross-section of the shafts relative to the effective cross-section of the plasticizing cylinder is about 1:5 to 1:10. The great advantage derived thereby is that a conversion ratio between the injection force and the engagement pressure is obtained so that a controlled adjustment is either required on a small scale only or, in simple cases, not at all any more. The mechanical system itself provides for real time control of the engagement force. Any additional electric-electronic control may be minimized or completely deleted, especially where the transmission comprises a self-locking transmission, for instance a worm gear. Of course, such a system makes sense or is possible, as the case may be, only where the structural mechanical elements are relatively rigid. An integrated spring would compel large and constant controlled adjustments. For especially simple applications it is possible to utilize inexpensive motors, for instance, squirrel cage motors, or dual or treble speed hoist motors. Preferably, the drive is constituted by a servomotor. The nozzle engagement force may be controlled by adjusting the torque of the servomotor or by a positional control. In a servomotor drive system either one can be controlled with very high precision by internal controls.

In accordance with a further embodiment the tie bolt or bolts, as the case may be, are constituted by ball or roller spindles. The injection unit is moved with as little play as possible by a rotary movement of a corresponding ball or roller nut. Preferably, the injection unit is provided with a guide plate supported by way of the tie bolts and supporting, directly connected to it, the electric motor drive. A very compact structure is obtained if the axial centers of the two spindles and of the drive motor constitute the points of a triangle and if the axes are interconnected by a common transmission wheel. Preferably, the axes of the two tie bolts or spindles, as the case may be, are arranged on opposite sides of the injection nozzle such that all three axes are positioned on a common center line.

Hereafter the invention will now be explained on the basis of several embodiments and further details.

DESCRIPTION OF THE PREFERRED EMBODIMENTS

Figure 1:
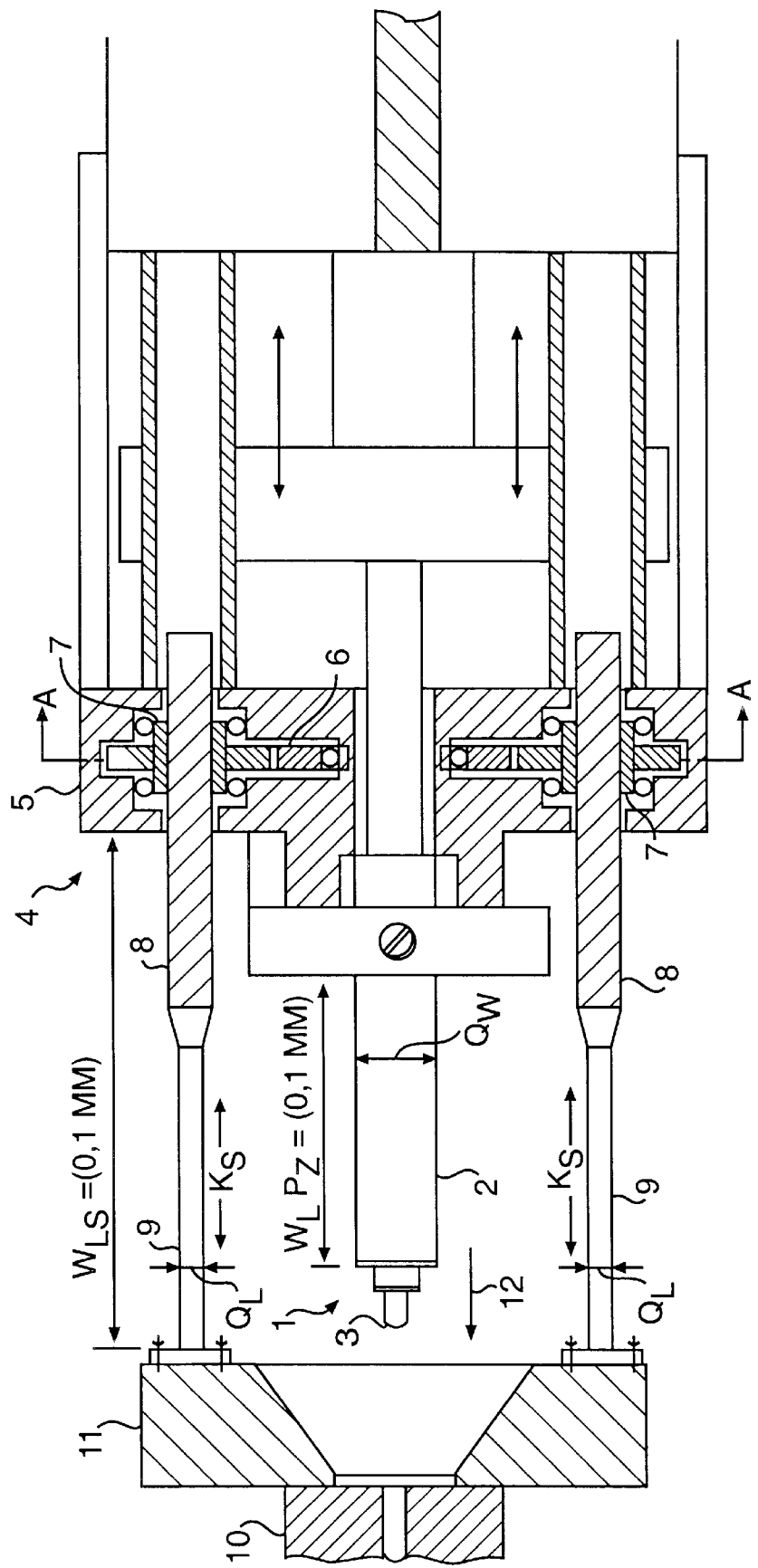
FIG. 1 is a cross-sectional view of the parts relevant for the nozzle engagement.

Hereafter, reference is made to FIG. 1 which depicts the apparatus for the nozzle engagement. An injection nozzle 1 constitutes the forward-most portion of a plasticizing cylinder 2 and terminates in a nozzle orifice 3.

The plasticizing cylinder 2 is rigidly mounted in the injection unit 4 or in a guide plate 5 of the injection unit 4, as the case may be. A transmission 6 provided in the guide plate 5 for converting, by means of two ball or roller nuts 7 received on corresponding ball or roller spindles 8, rotational movement into a linear movement for the injection unit 4 or plasticizing cylinder 2, as the case may be. The two roller spindles are each provided, in the direction of a stationary mold 10, with tie bolts or shafts 9, which are rigidly connected to a stationary mold plate 11. In this manner, a closed frame or force frame is formed, comprising the mold 10 or mold plate 11, the two shafts 9, as well as the guide plate 5. For purposes of the engagement movement the plasticizing cylinder 2 moves toward the mold 10 in the direction of the arrow 12. The engagement force of the plasticizing cylinder 2 initially exerts a tensional load on the two shafts 9. At the same time, the plasticizing cylinder is compressed by the value of the tensional load. When the injection process is commenced, the pressure of the plastic mass in the plasticizing cylinder 2 begins to rise up to maximum values of, for instance, 2,000 bar. This relatively high pressure causes a change in length, indicated by way of example as 0.1 mm. The change in length of the plasticizing cylinder 2 depends upon the corresponding module of elasticity, the effective material cross-section Qw as well as the effective length of the plasticizing cylinder 2 WLP2. For geometrically compelling reasons, because of the closed frame, the two shafts 9 will, however, now be extended by an identical amount, that is to say, 0.1 mm, in accordance with the example. Here, too, the corresponding change in length is distributed over the effective length WLS or, in accordance with known principles, over the respective lengths and cross-sections, as the case may be. In this connection, it is, however, decisive, that the change in length occurs mainly at the smallest cross-section which is identified by QL. The force Ks acting on each shaft 9 may be derived from the change in length and the effective cross-section, each shaft 9 being supported on the mold 10 by way of the plasticizing cylinder 2. Hence, as stated supra, the engagement force is derived from the initial clamping force and the tensional force. Provided the dimensions of the materials or the corresponding relationships are appropriately laid out, in many cases an electric/electronic adjustment control will no longer be required after the exertion of the initial engagement force.

Figure 2:
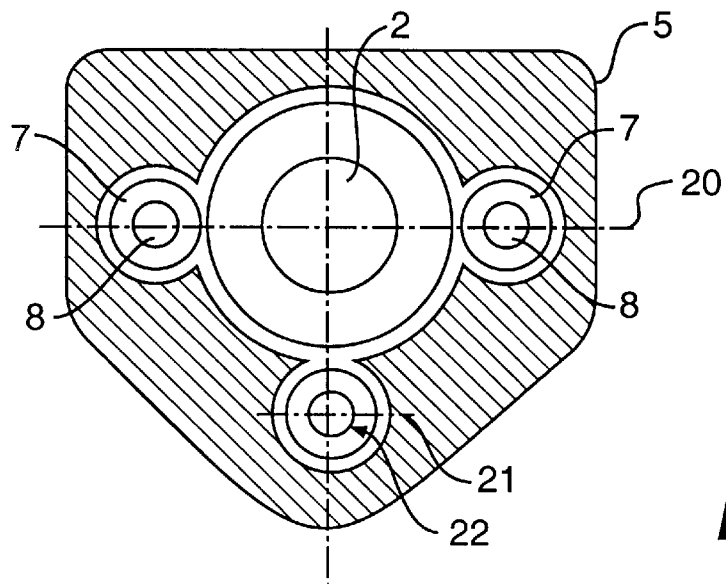
FIG. 2 is a cross-sectional view along line A—A of FIG. 1.

FIG. 2 schematically depicts the transmission which is arranged substantially to surround the plasticizing cylinder 2. The rotational axes of the two ball or roller spindles 8 as well as the center axis of the injection nozzle 1 lie on a common center line 20. Together with the axial centers 21 of a drive motor 22, the axial centers of the two roller or ball nuts 7 form a triangle.

Figure 3A:
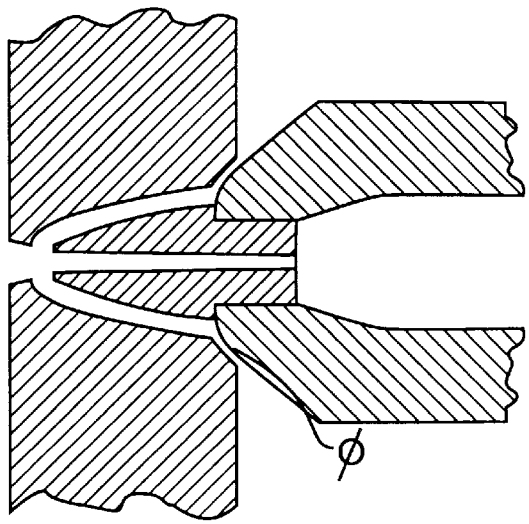
FIGS. 3, 3a and 3b depict typical nozzle configurations.
Figure 3B:
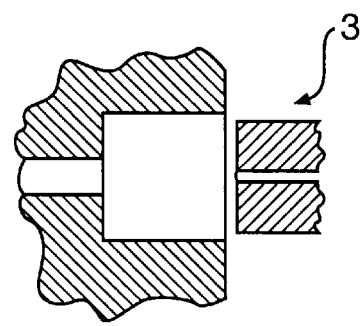
Figure 3:
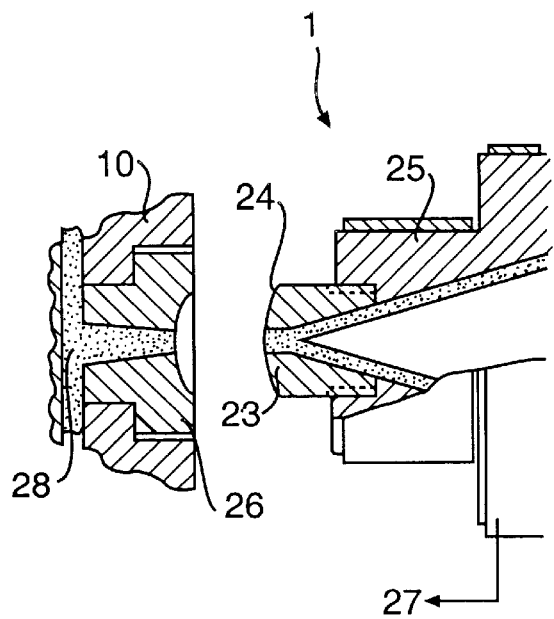

FIG. 3 displays an open nozzle (3) which is being moved into engagement with an injection port 26 of a mold 10 (arrow 27). A sprue 28 is formed as a stick sprue or cone sprue. The injection nozzle 1 comprises a nozzle 23 having a nozzle radius 24 and may be threaded into a cylinder head 25.

Figure 4:
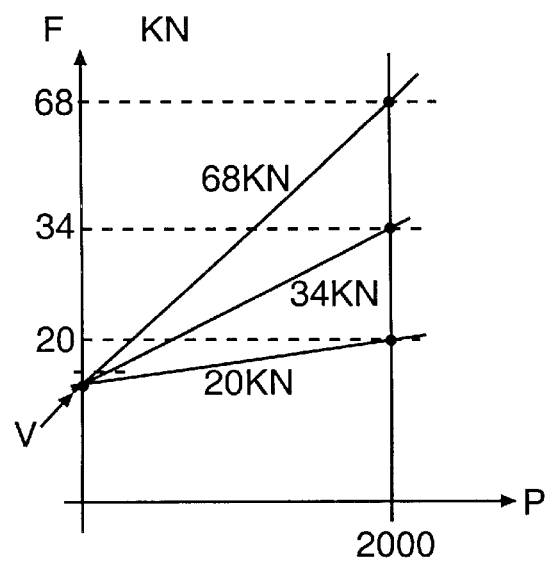
FIG. 4 is a schematic presentation of the force-pressure curves.

FIG. 4 depicts the interrelationship between the nominal engagement force and the pressure (P) in the forward chamber of the plasticizing screw, three characteristic curves proceeding from an initial clamping force (68 kN, 34 kN, 20 kN engagement force at 2,000 bar) being schematically shown.

Figure 5:
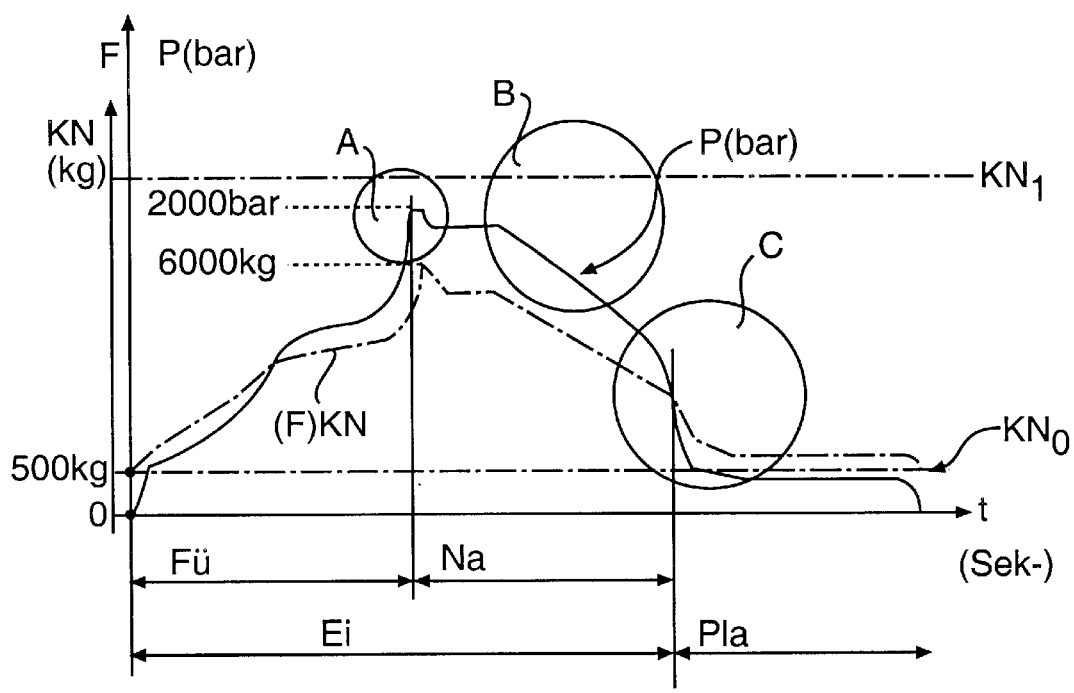
FIG. 5 is a schematic rendition of the injection pressure over time during an entire injection cycle.

FIG. 5 depicts the pressure (P) over time (t). An uppermost dash-dotted line (kN1) depicts the controlling characteristic pressure in accordance with the prior art, which remains at its maximum value throughout the entire injection cycle. The actual pressure progress P(bar) of the plastic mass within the injection cylinder is depicted in a bold solid line. In accordance with the novel invention a correlated controlled nozzle engagement force (F)kN (bold dash-dotted line) is generated, proceeding from an initial nozzle clamping force (kNo) and which increases the nozzle engagement force only by as much as is necessary. In accordance with the novel invention, the nozzle engagement force of FIG. 5 may be established in two ways. Either by a structural arrangement as set forth supra, or, in case of very strong shafts, by controlling either the torque of the drive motor or by a corresponding positional control of servomotors. In this connection, reference is made to the entire contents of Swiss Patent Application No. 00353/94-2. Of course, any combination is possible between a purely electronic control solution and the nozzle engagement control based upon the structural arrangement. In most cases the aim is, however, to keep the electric/electronic controlled adjustments as small as possible, so that in an ideal case, following a sufficient initial nozzle engagement force, the drive motor need only maintain its position. The individual sections of an injection molding cycle are marked. In it Fü stands for filling; Na stands for dwell pressure; Ei stand for injecting and Pla stands for plasticizing.

We claim:

1. A method for controlling the engagement of an injection nozzle against a mold in an injection molding machine, the injection nozzle for feeding material into the mold under pressure, the method comprising the steps of:

driving the injection nozzle into engagement with the mold using a springless transmission;

clamping the injection nozzle against the mold using the springless transmission to provide a clamping force; and controlling the clamping force as a function of the pressure of material injected into the mold.

2. The method of claim 1, wherein the step of driving the injection nozzle into engagement with the mold is controlled by a ramp brake.

3. The method of claim 1 wherein the material is fed into the mold according to a prescribed pressure profile, and wherein said adjusting step substantially tracks the pressure profile.

4. The method of claim 1 wherein the driving step is accomplished using a servomotor operatively connected to the springless transmission, and wherein the clamping force is controlled by adjustment of torque of the servomotor.

5. The method of claim 1 wherein the driving step is accomplished using a servomotor operatively connected to the springless transmission, and the nozzle engagement is determined by a positional control.

6. Apparatus for controlling nozzle engagement in an injection molding machine having an injection mold comprising:

an injection unit having an injection nozzle for feeding molding material under pressure and also having at least one shaft, the at least one shaft being attached to the injection nozzle and rigidly connected to the mold;

a springless transmission operatively connected to the at least one shaft for driving the injection nozzle into engagement with the mold and clamping the injection nozzle against the mold with a force; and control means responsive to the molding material pressure for controlling the clamping force.

7. The apparatus of claim 6, further comprising:

a plasticizing cylinder in flow communication with the injection nozzle, wherein the plasticizing cylinder and the at least one shaft have cross sections, and the ratio of the cross sections of the shaft to the plasticizing cylinder is greater than zero and $\leq 1/5$.

8. The apparatus of claim 7 wherein the ratio is about $1/10$.

9. The apparatus of claim 6 further comprising:

an electric drive operatively connected to the springless transmission; and wherein the control means is interconnected to the drive.

10. The apparatus of claim 9 wherein the electric drive is a rotary electric drive, and wherein the transmission has means for converting rotational movement of the drive into linear movement of the injection nozzle.

11. The apparatus of claim 10 wherein the converting means comprises a nut member that cooperates with a threaded portion on the at least one shaft.

12. The apparatus of claim 6 wherein the springless transmission comprises a self-locking transmission.

13. The apparatus of claim 11 wherein the self-locking transmission comprises a worm gear.

* * * * *